(12) United States Patent
Honda et al.

(10) Patent No.: US 9,158,108 B2
(45) Date of Patent: Oct. 13, 2015

(54) OPTICAL SCANNING DEVICE AND IMAGE DISPLAY DEVICE

(75) Inventors: Takeshi Honda, Tokyo (JP); Nobuaki Takanashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 205 days.

(21) Appl. No.: 13/812,895

(22) PCT Filed: Jul. 11, 2011

(86) PCT No.: PCT/JP2011/065811
§ 371 (c)(1),
(2), (4) Date: Jan. 29, 2013

(87) PCT Pub. No.: WO2012/014666
PCT Pub. Date: Feb. 2, 2012

(65) Prior Publication Data
US 2013/0128328 A1    May 23, 2013

(30) Foreign Application Priority Data
Jul. 29, 2010    (JP) .................................. 2010-170756

(51) Int. Cl.
*G02B 26/08*    (2006.01)
*G02B 26/10*    (2006.01)
*H04N 1/113*    (2006.01)

(52) U.S. Cl.
CPC ............ *G02B 26/10* (2013.01); *G02B 26/0858* (2013.01); *H04N 1/113* (2013.01)

(58) Field of Classification Search
CPC .. G02B 26/10; G02B 26/105; G02B 26/1084; G02B 26/1085; G02B 26/0841; G02B 26/0858
USPC .......... 359/196.1, 197.1, 198.1, 199.1, 199.2, 359/200.6, 212.1, 212.2, 213.1, 214.1, 359/220.1, 223, 224.1
See application file for complete search history.

(56) References Cited

U.S. PATENT DOCUMENTS 7,605,965 B2 * 10/2009 Tani et al. .................. 359/224.1
2007/0146858 A1   6/2007 Matsuda
2008/0144154 A1   6/2008 Asai

FOREIGN PATENT DOCUMENTS

JP    2001272626 A    10/2001
JP    2004177543 A    6/2004
(Continued)

OTHER PUBLICATIONS

Chinese Office Action for CN Application No. 201180037289.9 issued on Jul. 7, 2014 with English Translation.
(Continued)

*Primary Examiner* — Ricky Mack
*Assistant Examiner* — Robert E Tallman
(74) *Attorney, Agent, or Firm* — Sughrue Mion, PLLC

(57) ABSTRACT

An optical scanning device includes movable mirror (21) reflecting a light beam applied thereto, first beam (22) joined to an end of movable mirror (21), second beam (23) joined to another end of movable mirror (21), first piezoelectric element (11) generating stress or swinging movable mirror (21) through first beam (22), and second piezoelectric element (12) generating stress for swinging movable mirror (21) through first beam (22). First and second piezoelectric elements (11, 12) have respective patterns whose longitudinal directions are aligned with a longitudinal direction of first beam (11). First and second piezoelectric elements (11, 12) are disposed on a support plate (3) which is joined to the first and second beams (22 23) and with an insulative distance being present between first and second piezoelectric elements (11, 12).

6 Claims, 12 Drawing Sheets

(56) References Cited

FOREIGN PATENT DOCUMENTS

| | | |
|---|---|---|
| JP | 2005128147 A | 5/2005 |
| JP | 2007199682 A | 8/2007 |
| JP | 2007-268374 A | 10/2007 |
| JP | 2008145545 A | 6/2008 |
| JP | 2008145839 A | 6/2008 |
| JP | 2008310295 A | 12/2008 |
| JP | 2009195053 A | 8/2009 |
| JP | 2010237520 A | 10/2010 |

OTHER PUBLICATIONS

The international search report for PCT/JP2011/065811 mailed on Oct. 18, 2011.

* cited by examiner

Scanning light beam does not follow two tracks.

torsional vibration — 21

Scanning light beam follows two tracks.

OPTICAL SCANNING DEVICE AND IMAGE DISPLAY DEVICE

This application is a National Stage Entry of PCT/JP2011/065811 filed Jul. 11, 2011, which claims priority from Japanese Patent Application 2010-170756 filed Jul. 29, 2010, the contents of all of which are incorporated herein by reference, in their entirety.

TECHNICAL FIELD

The present invention relates to an optical scanning device having a movable component with a reflecting surface, for deflecting a reflected light beam from the reflecting surface by changing the angle between an incident light beam applied thereto and the reflecting surface, and an image display device.

BACKGROUND ART

Optical scanning devices for deflecting a light beam are widely used in digital copying machines, laser printers, barcode readers, scanners, and projectors, etc. Motor-actuated polygon mirrors and galvanomirrors have generally been finding use as such optical scanning devices.

In recent years, microprocessing technology has made great progress in the development of optical scanning devices based on MEMS (MicroElectroMechanical Systems). Particularly, attention has been paid to MEMS optical scanning devices which deflect a light beam by reciprocally vibrating a movable mirror about a beam used as a rotational shaft.

Movable mirrors fabricated according to the MEMS technology are advantageous in that they are structurally simpler, can be fabricated as an integral structure by the semiconductor fabrication process, can thus easily be reduced in size and cost, and hence can be operated at a higher speed, as compared with optical scanning devices with a motor-driven polygon mirror.

Optical scanning mirrors based on the MEMS technology are generally manufactured as a resonant mirror wherein the drive frequency and the resonant frequency of a structural body agree with each other for an increased deflection angle. The resonant frequency fr of the mirror is given from the modulus k of torsional elasticity of the beam and the moment $l_m$ of inertia of the mirror according to the following equation:

$$fr = 1/(2\pi)(k/l_m)^{1/2} \quad (1)$$

If the drive force applied to the mirror is represented by T, then the deflection angle θ of the mirror is given by the following equation:

$$\theta = QT/k \quad (2)$$

where Q represents the quality coefficient of the system, which has a typical value of about 100 in air and a typical value of about 1000 in vacuum. The equation indicates that the mirror actuated in resonance can be deflected greatly even if the drive force is small.

For increasing the deflection angle θ of the mirror, it is necessary to increase the drive force T or the quality coefficient Q.

One of schemes for producing a drive force is to use a piezoelectric element. Only optical scanning devices which incorporate a piezoelectric actuator will be described below. Optical scanning devices include a perpendicular layout type and a parallel layout type which are different from each other depending on whether the longitudinal direction of the piezoelectric element and the longitudinal direction of the torsional beam are perpendicular to each other or parallel to each other.

Examples of the optical scanning device of the perpendicular layout type are disclosed in Patent documents 1 through 4. The optical scanning devices disclosed in Patent documents 1 through 4 have a plurality of boards joined to a torsional beam and a plurality of piezoelectric elements mounted respectively on the boards. The optical scanning device of this type are characterized in that voltages of independent phrases are applied to the respective piezoelectric elements to generate a drive force in a rotational direction about the torsional beam.

Examples of the optical scanning device of the parallel layout type are disclosed in Patent document 5 and Patent document 6. Each of Patent document 5 and Patent document 6 reveals an optical scanning device wherein a torsional beam joined to a mirror is connected to a bifurcated board and piezoelectric elements are mounted on the respective board arms. In the optical scanning device of this type, voltages having independent phases are applied to the respective piezoelectric elements to actuate the optical scanning mirror.

The optical scanning devices disclosed respectively in Patent document 5 and Patent document 6 are characterized in that the longitudinal directions of the piezoelectric elements mounted on the respective board arms for imparting a rotational force to the torsional beam are in agreement with the longitudinal direction of the torsional beam. According to Patent document 5, there is a limitation in which the branch width of a second spring should not exceed the width of the reflecting mirror. Patent document 5 reveals that the limitation is needed in order to prevent the torsional beam from generating a vibration mode in a flexural direction in a frequency range lower than the natural frequency of the torsional beam in its rotational direction.

PRIOR TECHNICAL DOCUMENTS

Patent Documents

Patent document 1: JP2001-272626A
Patent document 2: JP2007-199682A
Patent document 3: JP2008-310295A
Patent document 4: JP2005-128147A
Patent document 5: JP2004-177543A
Patent document 6: JP2008-145545A

SUMMARY OF THE INVENTION

The optical scanning devices disclosed in Patent documents 1 through 4 have a board structure which is problematic in that the piezoelectric elements have a large area in their entirety because the longitudinal direction thereof extends perpendicularly to the longitudinal direction of the torsional beam. If the area in which the piezoelectric elements are mounted is limited, then the drive force generated by the piezoelectric elements is not large enough to give the mirror torsional vibrations that are needed to rotate the mirror.

The branch structure of the optical scanning devices disclosed in Patent document 5 and Patent document 6 require a hole to be formed between the piezoelectric elements. Since the hole limits the area in which the piezoelectric elements are mounted, the disclosed branch structure is problematic in that the drive force generated by the piezoelectric elements is not large enough to generate torsional vibrations required to rotate the mirror.

An exemplary object of the invention is to provide an optical scanning device and an image display device which can be reduced in size while guaranteeing the rotational angle of a mirror.

An optical scanning device according to an exemplary aspect of the invention includes a movable mirror reflecting a light beam applied thereto, a first beam joined to an end of the movable mirror, a second beam joined to another end of the movable mirror, a first piezoelectric element generating stress for swinging the movable mirror through the first beam when a first voltage is applied to the first piezoelectric element, and a second piezoelectric element generating stress for swinging the movable mirror through the first beam when a second voltage is applied to the second piezoelectric element, wherein the first piezoelectric element and the second piezoelectric element have respective patterns whose longitudinal directions are aligned with a longitudinal direction of the first beam, and the first piezoelectric element and the second piezoelectric element are disposed on a support plate which is joined to the first beam and the second beam and with an insulative distance being present between the first piezoelectric element and the second piezoelectric element.

An image display device according to an exemplary aspect of the invention includes the above optical scanning device according to the present invention as either a horizontal scanning element or a vertical scanning element.

DESCRIPTION OF EXEMPLARY EMBODIMENT

In order to clarify the above and other objects, features, and advantages of the present invention, the exemplary embodiments of the present invention will be described in detail below with reference to the drawings.

First Exemplary Embodiment

An optical scanning device according to the present exemplary embodiment serves to solve the above problems and is also capable of increasing the efficiency of optical scanning.

Figure 1:
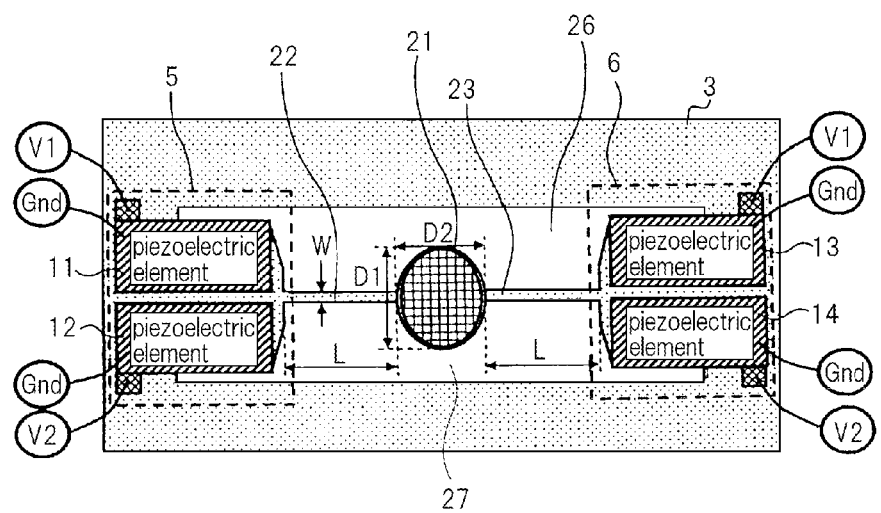
FIG. 1 is a plan view showing a configurational example of an optical scanning device according to a first exemplary embodiment.
Figure 2:
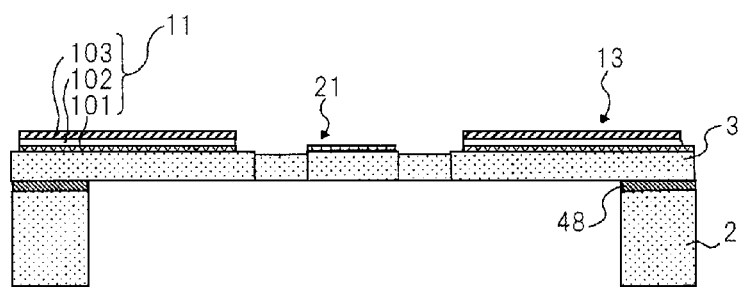
FIG. 2 is a cross-sectional view showing the configurational example of the optical scanning device according to the first exemplary embodiment.

The configuration of the optical scanning device according to the present exemplary embodiment will be described below. FIG. 1 is a plan view showing a configurational example of an optical scanning device according to a first exemplary embodiment, and FIG. 2 is a cross-sectional view of the optical scanning device.

The optical scanning device includes mirror 21 comprising a reflecting film which provides a mirror surface and a movable plate, two torsional beams 22, 23 joined to the movable plate of the mirror, support 3 joined to the torsional beams and supporting the torsional beams and the movable plate, frame 2 supporting support 3, and actuators 5, 6 for actuating the torsional beams and the mirror. Actuators 5, 6 are mounted on support 3. Mirror 21 is supported by torsional beams 22, 23 and surrounded by holes 26, 27 except for torsional beams 22, 23. Holes 26, 27 extend through support 3. Mirror 21 corresponds to a movable mirror.

The movable plate of mirror 21, torsional beams 22, 23, and support 3 are integrally formed of a material having appropriate rigidity. The material should preferably be single-crystal silicon (Si), elastic metal, or the like. For example, support 3 comprises an Si active layer, and frame 2 comprises an Si active layer which is thicker than support 3. The thickness of the Si active layer as support 3, which needs to be suitable for the application of the optical scanning device, should preferably be of several 10 μm. The thickness of frame 2 needs to be of about 500 μm for increased shock resistance.

In the configurational example shown in FIG. 1, the movable plate is in the shape of an elliptical cylinder having a size D1 (the length of the minor axis of the elliptical cylinder) along a direction perpendicular to torsional beams 22, 23 and a size D2 (the length of the major axis of the elliptical cylinder) along the longitudinal directions of torsional beams 22, 23. Torsional beams 22, 23 each have a length L, the longitudinal directions thereof, and a width D which is a length along a direction perpendicular to the longitudinal directions thereof. The sizes D1, D2 are in the range from 1 to 2 mm. The length L and the width W are determined depending on the resonant frequency and a mirror rotational angle that are needed. The length of support 3 along the longitudinal directions thereof and the width thereof depend on a drive force that is needed, though operational stability upon vibration is increased by increasing the size of support 3.

Actuator 5 is disposed at the base of torsional beam 22, whereas actuator 6 is disposed at the base of torsional beam 23. Actuator 5 has piezoelectric elements 11, 12 and actuator 6 has piezoelectric elements 13, 14. Piezoelectric elements 11 through 14 are of a rectangular pattern.

The longitudinal directions of the pattern of each of piezoelectric elements 11, 12 are aligned with the longitudinal directions of torsional beam 22. Piezoelectric elements 11, 12 are disposed on support 3 and spaced from each other with at least insulative distance therebetween. The longitudinal directions of the pattern of each of piezoelectric elements 13, 14 are aligned with the longitudinal directions of torsional beam 23. Piezoelectric elements 13, 14 are disposed on support 3 and spaced from each other with at least insulative distance therebetween.

Since not only longitudinal directions of the pattern of each of piezoelectric elements 11, 12 are aligned with the longitudinal directions of torsional beam 22, but also piezoelectric elements 11, 12 are spaced from each other with at least an insulative distance therebetween, there is no need to provide a hole between these piezoelectric elements, making it possible to reduce the planar area of the optical scanning device. This also holds true for piezoelectric elements 13, 14.

The configuration of piezoelectric elements 11 through 14 will be described below with reference to FIG. 2. FIG. 2 shows a cross-sectional structure of piezoelectric elements 11, 13 taken along a line thereacross in the plan view shown in FIG. 1. Though hole 26 is illustrated on both sides of mirror 21, FIG. 2 shows inner side walls of support 3.

As shown in FIG. 2, piezoelectric element 11 has lower electrode 101, piezoelectric layer 102, and upper electrode 103, which are successively disposed on an insulative film (not shown) that serves as an uppermost layer of support 3. Each of piezoelectric elements 12 through 14 also has lower electrode 101, piezoelectric layer 102, and upper electrode 103 as is the case with piezoelectric element 11.

An electrode pad which comprises a thin film of Al is used as upper electrode 103. According to the present exemplary embodiment, the thin film of Al is deposited by sputtering. However, upper electrode 103 may be made of other materials such as platinum (Pt) if it is held in sufficiently intimate contact with piezoelectric layer 102 and electrically conductive with respect to a silicon substrate. The film growth process forming the film of the electrode pad is not limited to sputtering, but may be other film growth processes. Lower electrode 101 is connected to an interconnect (not shown) extending out of the region where the piezoelectric elements are disposed and is connected to an electrode pad.

Each of piezoelectric elements 11 through 14 has lower electrode 101, piezoelectric layer 102, and upper electrode 103 separately from each other. Therefore, different voltages may be applied to the respective piezoelectric elements. It is assumed that the direction of polarization of piezoelectric elements 11 through 14 is upward with respect to the films thereof, a drive voltage is applied to lower electrode 101, and a Gnd voltage (ground potential) is applied to upper electrode 103. A voltage V1(t) is applied to lower electrodes 101 of piezoelectric elements 11, 13, whereas a voltage V2(t) is applied to lower electrodes 101 of piezoelectric elements 12, 14.

Figure 3:
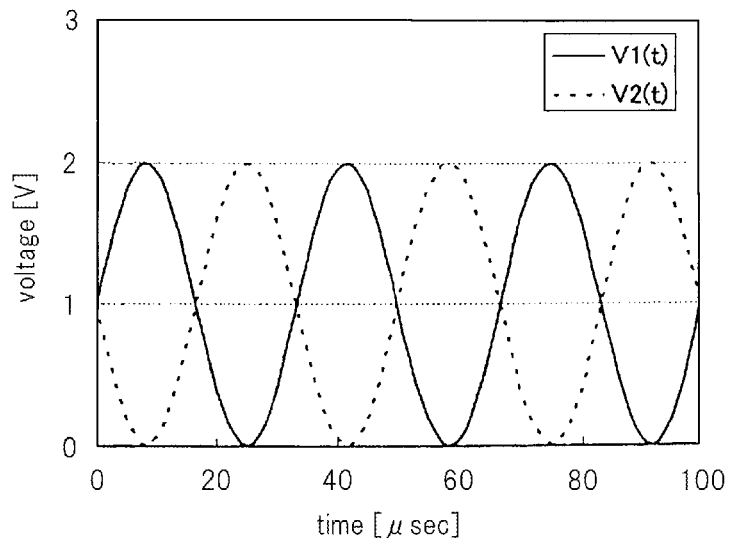
FIG. 3 is a graph showing an example of drive voltages applied to piezoelectric elements.

FIG. 3 is a graph showing an example of drive voltages V1(t), V2(t). The graph has a horizontal axis representing time and vertical axis voltages. In the graph shown in FIG. 3, the drive voltage V1(t) indicated by the solid-line curve and the drive voltage V2(t) indicated by the broken-line curve are 180 degrees out of phase with each other.

Operation of the optical scanning device according to the present exemplary embodiment will be described below.

According to the present exemplary embodiment, the voltage $V1(t)=0.5V_{p\text{-}p}(1+\sin(2\pi ft))$ [V] is applied to lower electrodes 101 of piezoelectric element 11 and piezoelectric element 13, and the voltage $V2(t)=0.5V_{p\text{-}p}(1+\sin(2\pi ft+\phi))$ [V] is applied to lower electrodes 101 of piezoelectric element 12 and piezoelectric element 14.

Figure 4:
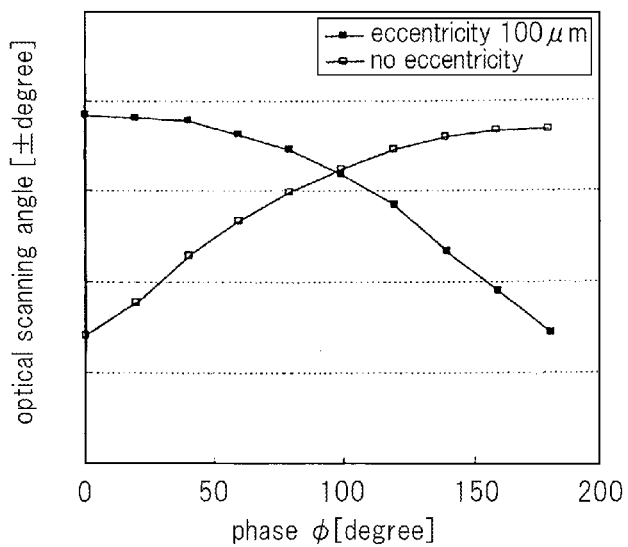
FIG. 4 is a graph showing the relationship between the phases of the drive voltages applied to the different piezoelectric elements and optical scanning angles.

FIG. 4 is a graph showing the scanning angles of a reflected light beam (twice the mirror rotational angle) at the time the phase difference φ between the voltage V1 and the voltage V2 changes from 0 degree to 180 degrees. The graph has a horizontal axis representing the phase difference and a vertical axis representing the optical scanning angle. FIG. 4 shows a curve plotted when mirror 21 is eccentrically displaced and a curve plotted when mirror 21 is not eccentrically displaced.

Mirror 21 which is not eccentrically displaced will be described below. The center of gravity of mirror 21 is positioned on the longitudinal central axis of torsional beams 22, 23. As shown in FIG. 4, with mirror 21 not eccentrically displaced, as the phase difference $\phi$ increases from 0 degree, the optical scanning angle becomes greater little by little. When the phase difference $\phi$ reaches 90 degrees or greater, the gradient of the change in the optical scanning angle becomes much greater. The optical scanning angle becomes maximum when the phase difference $\phi$ is 180 degrees. When $V1(t)=2$ [V] and $V2(t)=0$ [V], piezoelectric element 11 and piezoelectric element 13 are elongated along the longitudinal directions of their pattern, and piezoelectric element 12 and piezoelectric element 14 are shrunk along the longitudinal directions of their pattern, compared with their patterns at the time that an average voltage of 1 V is applied.

A portion of mirror 21 shown in FIG. 1 which is above the central axis of torsional beams 22, 23 is lifted, and a portion of mirror 21 shown in FIG. 1 which is below the central axis of torsional beams 22, 23 is lowered. As a result, mirror 21 is turned clockwise about the longitudinal central axis of torsional beams 22, 23 as viewed from torsional arm 22 toward torsional arm 23, tilting the reflecting film. Conversely, when $V1(t)=0$ [V] and $V2(t)=2$ [V], mirror 21 is turned in a direction opposite to the direction in which it is turned when $V1(t)=2$ [V] and $V2(t)=0$ [V], tilting the reflecting film.

Mirror 21 which is eccentrically displaced 100 μm will be described below. The center of gravity of mirror 21 is shifted 100 μm vertically from the longitudinal central axis of torsional beams 22, 23. As shown in FIG. 4, with mirror 21 eccentrically displaced 100 μm, the optical scanning angle is maximum when the phase difference $\phi$ is 0 degree. When $V1(t)=V2(t)=2$ [V], piezoelectric elements 11 through 14 are simultaneously elongated to swing mirror 11, and the swinging force is converted into a rotating force for mirror 21 by the eccentricity of mirror 21. As a result, a portion of mirror 21 which includes the center of gravity is lowered to turn mirror 21 about the longitudinal central axis of torsional beams 22, 23, tilting the reflecting film.

A process of manufacturing the optical scanning device thus constructed will be described below. FIGS. 5A through 8D are cross-sectional views showing the process of manufacturing the optical scanning device according to the present exemplary embodiment.

Figure 5A:
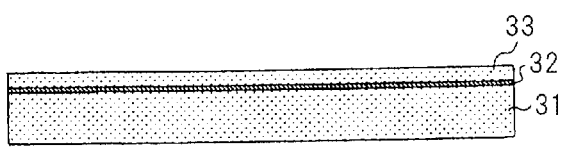
FIG. 5A is a cross-sectional view showing a process of manufacturing the optical scanning device according to the first exemplary embodiment.

As shown in FIG. 5A, an SOI (Silicon On Insulator) board is prepared which includes $SiO_2$ layer 32 and Si active layer 33 that are successively deposited on Si support layer 31. Si support layer 31 has a thickness of 475 μm, $SiO_2$ layer 32 has a thickness of 2 μm, and Si active layer 33 has a thickness of 50 μm. Si support layer 31 is a substrate for forming frame 2. Si active layer 33 is a device substrate for forming support 3, torsional beams 22, 23, and the movable plate. Si active layer 33 is oxidized to produce a silicon oxide film on its own upper surface. However, such a silicon oxide film is omitted from illustration in FIG. 5A.

Figure 5B:
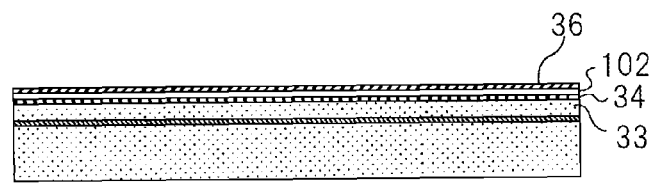
FIG. 5B is a cross-sectional view showing the process of manufacturing the optical scanning device according to the first exemplary embodiment.
Figure 5C:
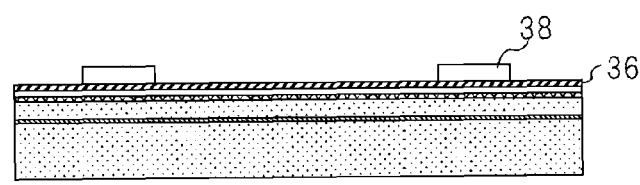
FIG. 5C is a cross-sectional view showing the process of manufacturing the optical scanning device according to the first exemplary embodiment.

Then, electrically conductive film 34 for forming lower electrode 101, piezoelectric layer 102, and electrically conductive film 36 for forming upper electrode 103 are successively formed on the silicon oxide film (not shown) on Si active layer 33 by sputtering (FIG. 5B). Of these films, electrically conductive film 34 is made of Pt, piezoelectric layer 102 of PZT (lead zirconate titanate), and electrically conductive film 36 of gold (Au), for example.

Figure 5D:
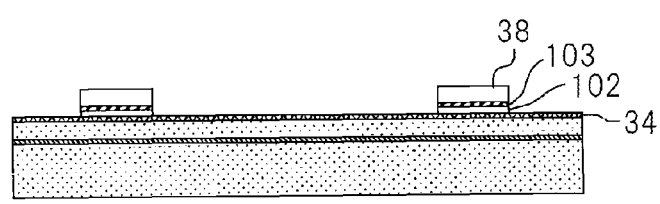
FIG. 5D is a cross-sectional view showing the process of manufacturing the optical scanning device according to the first exemplary embodiment.
Figure 5E:
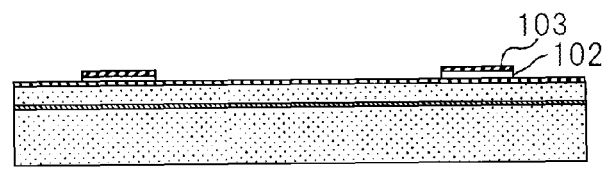
FIG. 5E is a cross-sectional view showing the process of manufacturing the optical scanning device according to the first exemplary embodiment.

Thereafter, electrically conductive film 36 is coated with a resist, which is then shaped into resist 38 having the pattern of upper electrode 103 (FIG. 5C) by lithography. A process for processing a resist applied to a substrate into a pattern according to lithography will hereinafter be referred to as "resist patterning". Using resist 38 as a mask, electrically conductive film 36 and piezoelectric layer 102 are etched until the upper surface of electrically conductive film 34 is exposed, thereby forming upper electrode 103 and piezoelectric layer 102 of a piezoelectric element (FIG. 5D). Since electrically conductive film 36 and piezoelectric layer 102 are etched using resist 38 as a mask, the patterns of upper electrode 103 and piezoelectric layer 102 have the same area after the etching process. Thereafter, resist 38 is removed (FIG. 5E).

Figure 6A:
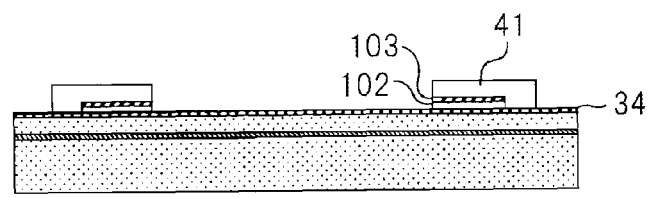
FIG. 6A is a cross-sectional view showing a process of manufacturing the optical scanning device according to the first exemplary embodiment.
Figure 6B:
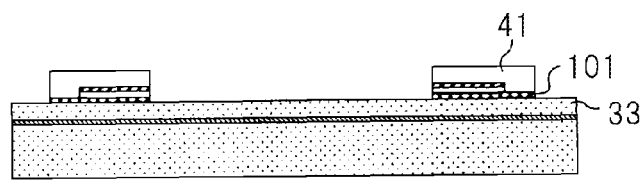
FIG. 6B is a cross-sectional view showing the process of manufacturing the optical scanning device according to the first exemplary embodiment.
Figure 6C:
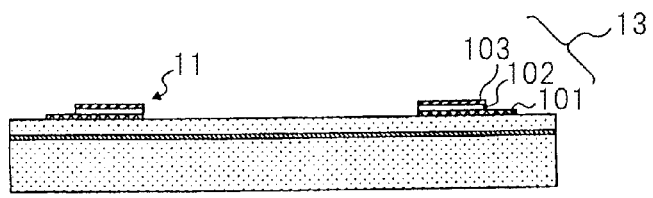
FIG. 6C is a cross-sectional view showing the process of manufacturing the optical scanning device according to the first exemplary embodiment.

As shown in FIG. 6A, resist patterning is carried out to form resist 41 for forming lower electrode 101 shown in FIG. 2 on electrically conductive film 34. Then, using resist 41 as a mask, electrically conductive film 34 is etched until the upper surface of Si active layer 33 is exposed, thereby forming lower electrode 101 (FIG. 6B). Thereafter, resist 41 is removed (FIG. 6C). FIG. 6C shows a cross-sectional structure of piezoelectric elements 11, 13 thus formed. While the cross-sectional structure of piezoelectric elements 11, 13 is shown in FIG. 6C, piezoelectric elements 12, 14 shown in FIG. 1 are also simultaneously formed.

Figure 6D:
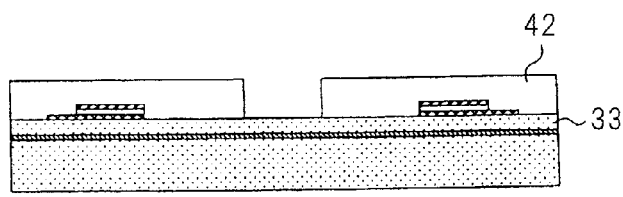
FIG. 6D is a cross-sectional view showing the process of manufacturing the optical scanning device according to the first exemplary embodiment.
Figure 6E:
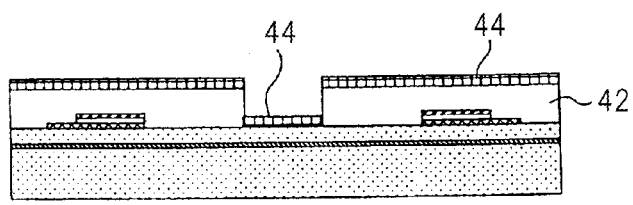
FIG. 6E is a cross-sectional view showing the process of manufacturing the optical scanning device according to the first exemplary embodiment.

Then, as shown in FIG. 6D, resist patterning is carried out to form, on Si active layer 33, resist 42 with an opening defined in a portion corresponding to the mirror surface of mirror 21 shown in FIG. 1. Reflecting film 44 is then formed in the opening and on resist 42 by evaporation (FIG. 6E). Reflecting film 44 is made of aluminum or silver alloy, for example.

Figure 7A:
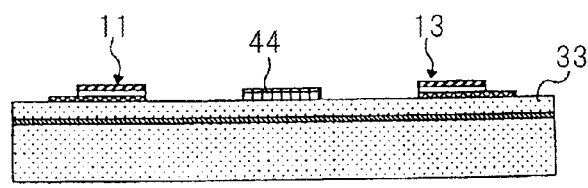
FIG. 7A is a cross-sectional view showing a process of manufacturing the optical scanning device according to the first exemplary embodiment.
Figure 7B:
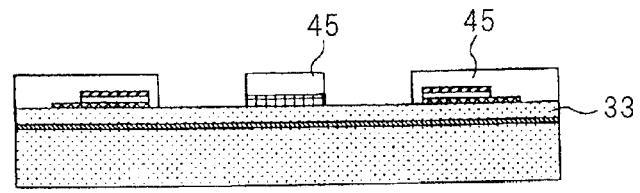
FIG. 7B is a cross-sectional view showing the process of manufacturing the optical scanning device according to the first exemplary embodiment.

As shown in FIG. 7A, lift-off is performed to remove the resist and also the film deposited on the resist. Thus, reflecting film 44 on resist 42 is removed together with resist 42, leaving reflecting film 44 on Si active layer 33 in the portion corresponding to the opening in resist 42 shown in FIG. 6D. As shown in FIG. 7B, resist patterning is performed to form resist 45 for patterning Si active layer 33 on Si active layer 33.

Figure 7C:
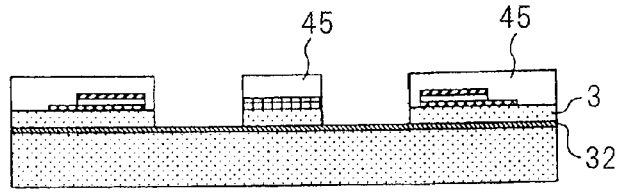
FIG. 7C is a cross-sectional view showing the process of manufacturing the optical scanning device according to the first exemplary embodiment.
Figure 7D:
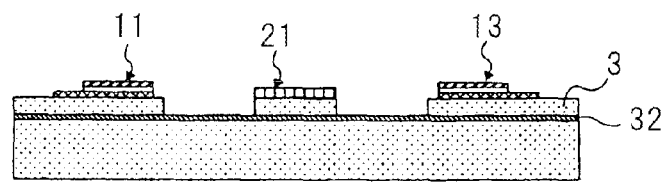
FIG. 7D is a cross-sectional view showing the process of manufacturing the optical scanning device according to the first exemplary embodiment.
Figure 7E:
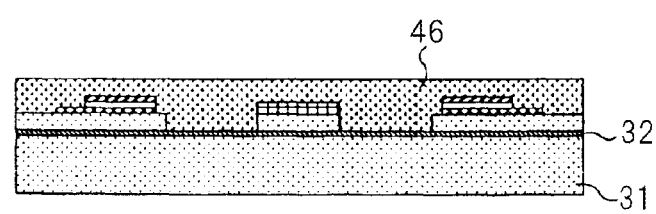
FIG. 7E is a cross-sectional view showing the process of manufacturing the optical scanning device according to the first exemplary embodiment.

Then, using resist 45 as a mask, Si active layer 33 is etched until the upper surface of $SiO_2$ layer 32 is exposed (FIG. 7C). Before Si active layer 33 is etched, an oxide film may be removed by BOE (Buffered Oxide Etching). If a natural oxide film has been formed on the upper surfaced of Si active layer 33, then the natural oxide film is now removed, allowing Si active layer 33 to be etched smoothly. After Si active layer 33 is etched, resist 45 is removed (FIG. 7D). Support 3 and mirror 21 are now formed. Though not illustrated in the cross-sectional structure shown in FIG. 7D, mirror 21 is connected to support 3. As shown in FIG. 7E, protective film 46 is formed on $SiO_2$ layer 32 in covering relation to mirror 21, piezoelectric elements 11 through 14, and support 3 in preparation for etching from the reverse side of Si supports layer 31.

Figure 8A:
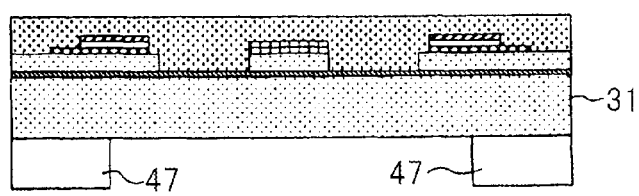
FIG. 8A is a cross-sectional view showing a process of manufacturing the optical scanning device according to the first exemplary embodiment.
Figure 8B:
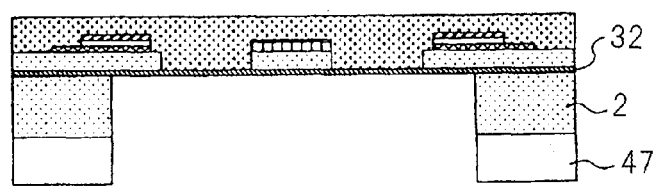
FIG. 8B is a cross-sectional view showing the process of manufacturing the optical scanning device according to the first exemplary embodiment.
Figure 8C:
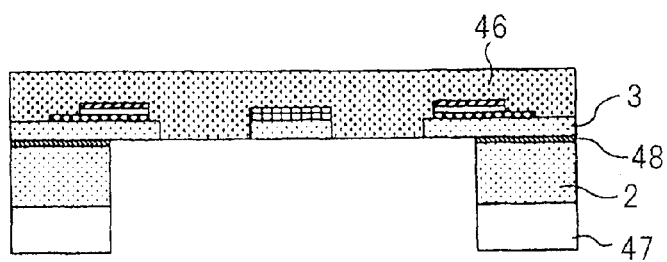
FIG. 8C is a cross-sectional view showing the process of manufacturing the optical scanning device according to the first exemplary embodiment.
Figure 8D:
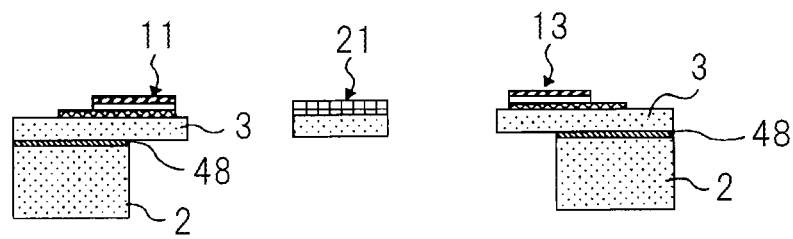
FIG. 8D is a cross-sectional view showing the process of manufacturing the optical scanning device according to the first exemplary embodiment.

As shown in FIG. 8A, resist patterning is carried out to form resist 47 on the reverse side of Si supports layer 31. Then, using resist 47 as a mask, Si support layer 31 is etched until the reverse side of $SiO_2$ layer 32 is exposed (FIG. 8B). Frame 2 is now formed. Thereafter, using resist 47 as a mask, $SiO_2$ layer 32 is etched, forming BOX layer 48 from $SiO_2$ layer 32 that is left between support 3 and frame 2 (FIG. 8C). Resist 47 and protective film 46 are then removed (FIG. 8D). Thereafter, dicing is performed to produce individual optical scanning devices.

Figure 9:
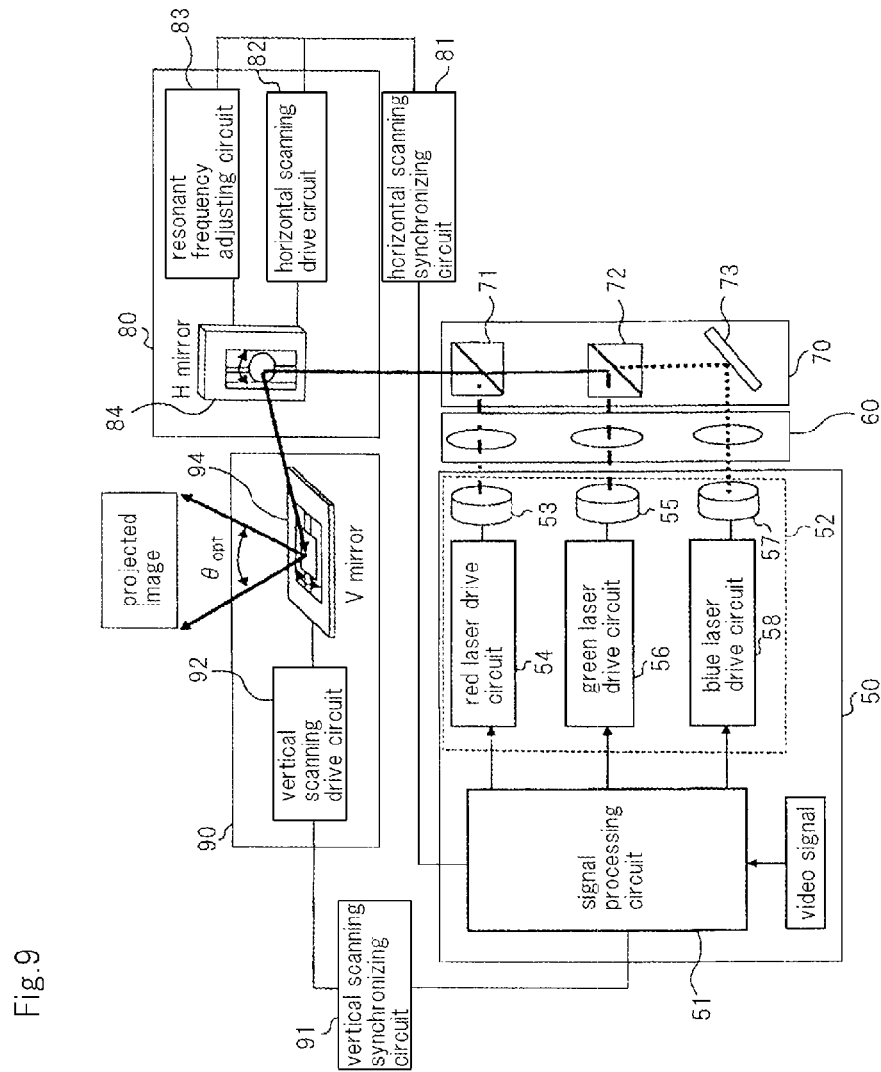
FIG. 9 is a block diagram showing a configurational example of an image display device which incorporates the optical scanning device according to the first exemplary embodiment.

The configuration and operation of an image display device which incorporates an optical scanning device having the above configuration will be described below. FIG. 9 is a block diagram showing a configurational example of an image display device which incorporates the optical scanning device according to the first exemplary embodiment.

As shown in FIG. 9, the image display device includes light beam generator 50 for generating light beams modulated depending on a video signal that is supplied from an external source, collimating optical system 60 for converting the light beams generated by light beam generator 50 into parallel light beams, combining optical system 70 for combining the light beams, horizontal scanner 80 for horizontally deflecting the light beam combined by combining optical system 70 to display an image based on the light beam, vertical scanner 90 for vertically deflecting the light beam that has been horizontally deflected by horizontally scanner 80, horizontal scanning synchronizing circuit 81 and vertical scanning synchronizing circuit 91, and an optical system (not shown) for emitting the horizontally and vertically deflected light beam onto a screen.

Light beam generator 50 has signal processing circuit 51 and light source assembly 52 for emitting light beams based on three video signals (R, G, B) output from signal processing circuit 51. When signal processing circuit 51 is supplied with a video signal, it generates video signals in red (R), green (G), and blue (B) as elements for producing an image based on the supplied video signal, and sends the generated video signals to light source assembly 52. Signal processing circuit 51 also outputs a horizontal synchronizing signal based on the supplied video signal through horizontal scanning synchronizing circuit 81 to horizontal scanner 80, and outputs a vertical synchronizing signal based on the supplied video signal through vertical scanning synchronizing circuit 91 to vertical scanner 90.

Light source assembly 52 has a red laser drive system, a green laser drive system, and a green laser drive system. The red laser drive system has red laser 53 for generating a red laser beam and red laser drive circuit 54 for energizing red laser 53. The green laser drive system has green laser 55 for generating a green laser beam and green laser drive circuit 56 for energizing green laser 55. The blue laser drive system has blue laser 57 for generating a blue laser beam and blue laser drive circuit 58 for energizing blue laser 57.

Each of the red, green, and blue lasers may comprise a semiconductor laser or a solid-state laser with a second harmonic generation (SHG) mechanism.

Combining optical system 70 has dichroic mirrors 71 through 73 which are associated respectively with the red, green, and blue laser beams. Dichroic mirrors 71 through 73 selectively reflect and transmit the red, green, and blue laser beams, respectively, based on their wavelengths.

The red, green, and blue laser beams that are emitted from the respective lasers of light beam generator 50 are converted by collimating optical system 60 into parallel laser beams, which are applied respectively to dichroic mirrors 71 through 73 of combining optical system 50. The red, green, and blue laser beams that are applied respectively to dichroic mirrors 71 through 73 are selectively reflected and transmitted based on their wavelengths, converge, and are output to horizontal scanner 80.

Horizontal scanner 80 horizontally deflects the laser beams come from combining optical system 70 in order to project them as an image. Vertical scanner 90 vertically deflects the laser beams come from combining optical system 70 in order to project them as an image. Horizontal scanner 80 and signal processing circuit 51 function as a horizontal light beam scanning device, and vertical scanner 90 and signal processing circuit 51 function as a vertical light beam scanning device.

Horizontal scanner 80 includes horizontal scanning element 84 for horizontally deflecting the laser beams, horizontal scanning drive circuit 82 for actuating horizontal scanning element 84, and resonant frequency adjusting circuit 83 for adjusting the resonant frequency of horizontal scanning element 84. Vertical scanner 90 includes vertical scanning element 94 for vertically deflecting the laser beams and vertical scanning drive circuit 90 for actuating vertical scanning element 94. Horizontal scanning drive circuit 82 actuates horizontal scanning element 84 based on the horizontal synchronizing signal output from signal processing circuit 51, and vertical scanning drive circuit 92 actuates vertical scanning element 94 based on the vertical synchronizing signal output from signal processing circuit 51.

The optical scanning device shown in FIG. 1 is used as horizontal scanning element 84 shown in FIG. 9. Mirror 21 shown in FIG. 1 serves as a horizontal mirror (H mirror) of horizontal scanning element 84. The optical scanning device shown in FIG. 1 may not be limited to horizontal scanning element 84, but may also be used as vertical scanning element 94. If optical scanning device shown in FIG. 1 is used as vertical scanning element 94, then mirror 21 shown in FIG. 1 serves as a vertical mirror (V mirror) of vertical scanning element 94.

The optical scanning device according to the present exemplary embodiment is capable of turning the mirror efficiently for the reasons described below.

Basically, it is necessary to reduce the moment of inertia of the mirror, and the mirror should advantageously be of a structure with minimum eccentricity. However, when the voltages applied to the piezoelectric elements are in phase with each other, if the mirror has small eccentricity, then its rotational angle cannot be increased. Conversely, if the mirror has large eccentricity, then since the moment of inertia of the mirror increases, the torsional beams need to be highly rigid, resulting in a reduction in the mirror rotational angle. With the optical scanning device according to the present exemplary embodiment, even if the mirror is not eccentrically displaced, since the voltages applied to the piezoelectric elements can be adjusted in phase as desired, the mirror rotational angle can be of maximized efficiency. The optical scanning device consumes low electric power by adjusting the phase of the voltages applied to the piezoelectric elements for efficiently turning the mirror.

According to the present exemplary embodiment, furthermore, the voltages applied to the piezoelectric elements are brought out of phase with each other to make the mirror highly resistant to destruction when they are actuated. Particularly, the phase difference is highly effective to reduce destructive stresses at the bases of the torsional beams. A simulation indicates that a maximum stress of 700 [MPa] at the time that the piezoelectric elements are actuated in phase with each other ($\phi=0$ degree) can be reduced to 400 [MPa] at the time that they are actuated in opposite phase with each other ($\phi=180$ degrees).

According to the present exemplary embodiment, moreover, the piezoelectric elements disposed at the base of one torsional beam are disposed on the support plate as closely to each other as possible without any holes defined therebetween. If two piezoelectric elements are disposed on the board arms of a bifurcated board which are about 0.8 mm apart from each other, then according to a simulation, a maximum stress of about 640 [MPa] is generated at the bases of the torsional beams when the mirror is turned. If two piezoelectric elements are disposed on the board arms of a bifurcated board which are about 0.2 mm apart from each other, then a maximum stress of about 510 [MPa] is generated at the bases of the torsional beams when the mirror is turned. However, since the board is not bifurcated, according to the present exemplary embodiment, the maximum stress is reduced to about 410 [MPa].

According to the present exemplary embodiment, furthermore, since the piezoelectric elements and the mirror are disposed in the vicinity of each other, the area and volume of the optical scanning device can be reduced in size. Even though the optical scanning device is of the small-size structure according to the present exemplary embodiment, it is capable of generating sufficient drive forces for sufficiently turning the mirror while allowing the actuators for turning the mirror to be sufficiently rigid.

The image display device can be reduced in overall size by incorporating the optical scanning device according to the present exemplary embodiment as horizontal scanning element 84 or vertical scanning element 94 shown in FIG. 9 or both.

Second Exemplary Embodiment

An optical scanning device according to the present exemplary embodiment can be made smaller in size than the structure according to the first exemplary embodiment.

Figure 10:
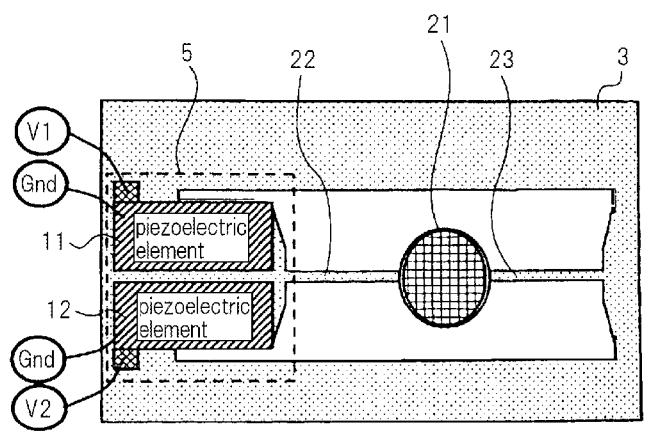
FIG. 10 is a plan view showing a configurational example of an optical scanning device according to a second exemplary embodiment.

The configuration of the optical scanning device according to the present exemplary embodiment will be described below. FIG. 10 is a plan view showing a configurational example of the optical scanning device according to the present exemplary embodiment. Those parts of the optical scanning device according to the second exemplary embodiment which are identical to those according to the first exemplary embodiment are denoted by identical reference characters, and will not be described in detail below. A cross-sectional view of the optical scanning device according to the present exemplary embodiment and its description are the same as FIG. 2 and the description of FIG. 2, and are omitted hereinbelow.

As shown in FIG. 10, the optical scanning device according to the present exemplary embodiment is different from the optical scanning device shown in FIG. 1 in that it is free of actuator 6. Therefore, the optical scanning device according to the present exemplary embodiment is smaller in size along the longitudinal directions thereof than the optical scanning device shown in FIG. 1 by the length required by actuator 6.

Operation of the optical scanning device according to the present exemplary embodiment will be described below.

According to the present exemplary embodiment, it is assumed that a voltage V1(*t*) is applied to lower electrode 101 of piezoelectric element 11, whereas a voltage V2(*t*) is applied to lower electrode 101 of piezoelectric element 12. The voltages V1(*t*), V2(*t*) are the same as the voltages in the graph shown in FIG. 3. The voltage V1(*t*) and the voltage V2(*t*) are 180 degrees out of phase with each other and are applied to impart drive forces to piezoelectric element 11 and piezoelectric element 12 for turning the mirror 12 about the longitudinal axis of torsional beams 22, 23.

For example, V1(*t*)=0.5V$_{p-p}$ (1+sin (2πft)) [V] and V2(*t*)=0.5V$_{p-p}$ (1−sin (2πft)). When V1(*t*)=2 [V] and V2(*t*)=0 [V], piezoelectric element 11 is elongated along the longitudinal directions of its pattern, and piezoelectric element 12 is shrunk along the longitudinal directions of their patterns, compared with their patterns at the time that an average voltage of 1 V is applied. A portion of mirror 21 shown in FIG. 10 which is above the central axis of torsional beams 22, 23 is lifted, and a portion of mirror 21 shown in FIG. 10 which is below the central axis of torsional beams 22, 23 is lowered. As a result, mirror 21 is turned clockwise about the longitudinal central axis of torsional beams 22, 23 as viewed from torsional arm 22 toward torsional arm 23, tilting the reflecting film. Conversely, when V1(*t*)=0 [V] and V2(*t*)=2 [V], mirror 21 is turned in a direction opposite to the direction in which it is turned when V1(*t*)=2 [V] and V2(*t*)=0 [V], tilting the reflecting film.

According to the present exemplary embodiment, since the piezoelectric elements are disposed on only torsional beam 22 joined to the mirror 21, the optical scanning device can be made smaller in overall size than the first exemplary embodiment. The present exemplary embodiment offers the same advantages as the first exemplary embodiment.

Third Exemplary Embodiment

An optical scanning device according to the present exemplary embodiment is capable of adjusting the resonant frequency of the mirror.

Figure 11:
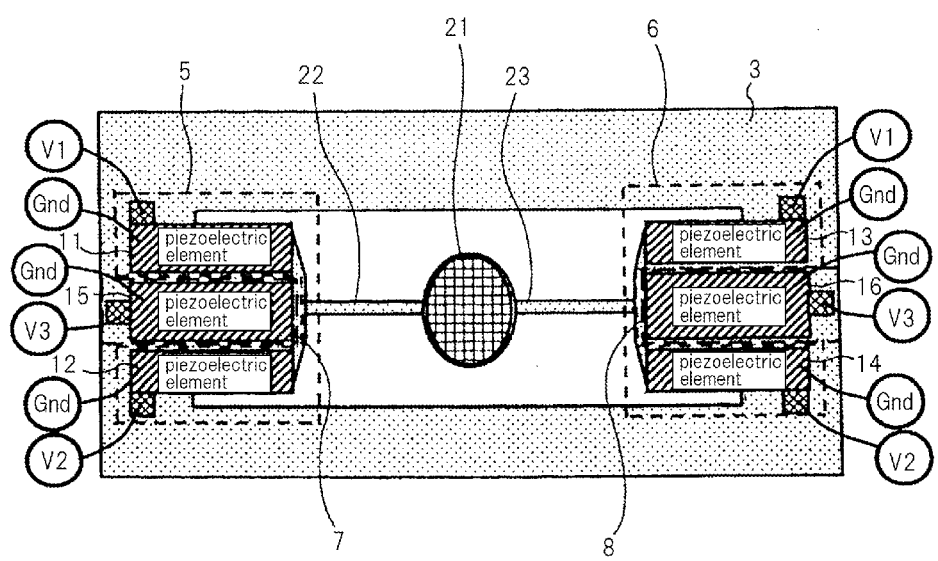
FIG. 11 is a plan view showing a configurational example of an optical scanning device according to a third exemplary embodiment.

The configuration of the optical scanning device according to the present exemplary embodiment will be described below. FIG. 11 is a plan view showing a configurational example of the optical scanning device according to the present exemplary embodiment. Those parts of the optical scanning device according to the third exemplary embodiment which are identical to those according to the first exemplary embodiment are denoted by identical reference characters, and will not be described in detail below. A cross-sectional view of the optical scanning device according to the present exemplary embodiment and its description are the same as FIG. 2 and the description of FIG. 2, and are omitted hereinbelow.

As shown in FIG. 11, the optical scanning device according to the present exemplary embodiment is different from the optical scanning device shown in FIG. 1 in that it additionally includes adjuster 7 and adjuster 8 for adjusting the resonant frequency of mirror 21. Adjuster 7 which comprises piezoelectric element 15 is disposed between piezoelectric element 11 and piezoelectric element 12, and adjuster 8 which comprises piezoelectric element 16 is disposed between piezoelectric element 13 and piezoelectric element 14.

As described above with reference to FIG. 2, piezoelectric elements 15, 16 each have lower electrode 101, piezoelectric layer 102, and upper electrode 103. Piezoelectric elements 15, 16 are the same as piezoelectric elements 11 through 14 in that piezoelectric layer 102 is polarized upwardly with respect to the film, a drive voltage is applied to lower electrode 101, and a Gnd voltage is applied to upper electrode 103.

As shown in FIG. 11, piezoelectric element 15 is mounted on the joint of torsional beam 22 to support 3, and piezoelectric element 16 is mounted on the joint of torsional beam 23 to support 3. When the same static voltage (DC voltage) V3 is applied to lower electrodes 101 of piezoelectric elements 15, 16, piezoelectric elements 15, 16 cause stress to be applied to two torsional beams 22, 23 to adjust the rigidity thereof, thereby adjusting the resonant frequency of mirror 21.

As with piezoelectric elements 11, 12, piezoelectric element 15 has a pattern whose longitudinal direction is aligned with the longitudinal direction of torsional beam 22. Piezoelectric element 15 is disposed on the same support 3 with at least insulative distances from piezoelectric element 11 and piezoelectric element 12. As with piezoelectric elements 13, 14, piezoelectric element 16 has a pattern whose longitudinal direction is aligned with the longitudinal direction of torsional beam 23. Piezoelectric element 16 is disposed on the same support 3 with at least insulative distances from piezoelectric element 13 and piezoelectric element 14.

According to the present exemplary embodiment, though piezoelectric elements 11 through 16 are provided, not only the longitudinal directions of the patterns of the respective piezoelectric elements are aligned with the longitudinal directions of torsional beams 22, 23, but also the piezoelectric elements are spaced minimally with at least an insulative distance therebetween, and there is no need to provide a hole between these piezoelectric elements, making it possible to reduce the planar area of the optical scanning device.

No hole is provided, but piezoelectric element 15 is disposed, between piezoelectric element 11 and piezoelectric element 12, and no hole is provided, but piezoelectric element 16 is disposed, between piezoelectric element 13 and piezoelectric element 14. Therefore, as described in detail later, the resonant frequency of mirror 21 can be adjusted.

With the Configurational example shown in FIG. 11, the widths of piezoelectric elements 11 through 14, which are lengths along a direction perpendicular to the longitudinal directions of the patterns, are smaller than with the first exemplary embodiment. Therefore, even though piezoelectric element 15 is disposed between piezoelectric element 11 and piezoelectric element 12 and piezoelectric element 16 is disposed between piezoelectric element 13 and piezoelectric element 14, the overall width of these piezoelectric elements is minimized, preventing the width of the optical scanning device from increasing.

Operation of the optical scanning device according to the present exemplary embodiment will be described below.

According to the present exemplary embodiment, a voltage $V1(t)$ is applied to lower electrodes 101 of piezoelectric element 11 and piezoelectric element 13, and a voltage $V2(t)$ is applied to lower electrodes 101 of piezoelectric element 12 and piezoelectric element 14. The same DC voltage V3 [V] is applied to lower electrodes 101 of piezoelectric element 15 and piezoelectric element 16. The voltages $V1(t)$, $V2(t)$ are the same as the voltages in the graph shown in FIG. 3. It is assumed that mirror 21 is not eccentrically displaced. When the phase difference $\phi$ between the voltage $V1(t)$ and the voltage $V2(t)$ is 180 degrees, the rotational angle of mirror 21 is maximum. For example, when $V1(t)=1+\sin(2\pi ft)$ [V] and $V2(t)=1-\sin(2\pi ft)$ [V] are applied, the deflection angle of mirror 21 is maximum.

Figure 12:
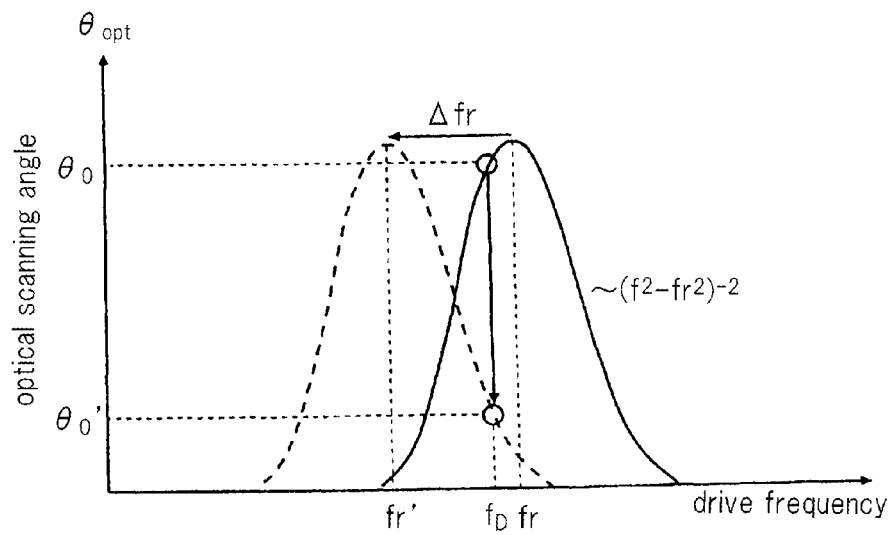
FIG. 12 is a graph showing the relationship between optical scanning angles and drive frequencies.

Prior to the description of operation of adjusters 7, 8, the fact that it is important to adjust the resonant frequency of mirror 21 for the rendition of an image on the image display device will be described below with reference to FIG. 12. FIG. 12 is a graph showing the relationship between optical scanning angles and drive frequencies. The graph has a vertical axis representing optical scanning angles and a horizontal axis representing drive frequencies.

It is assumed that the resonant frequency of mirror 21 is represented by fr and the optical scanning angle is represented by $\theta_0$, and the drive frequency $f_D$ is set to a value slightly shifted from the resonant frequency. When resonant frequency fr is shifted by $\Delta$fr and changed to fr' due to a temperature rise or the like (FIG. 12 shows a decreasing change), the optical scanning angle at the drive frequency $f_D$ is greatly reduced, so that the size of an image projected by the image display device shown in FIG. 9 is greatly reduced to $\theta_0$'. This poses a large problem on the image rendering characteristics, and it is necessary to adjust the drive frequency so as not to decrease the resonant frequency.

Figure 13:
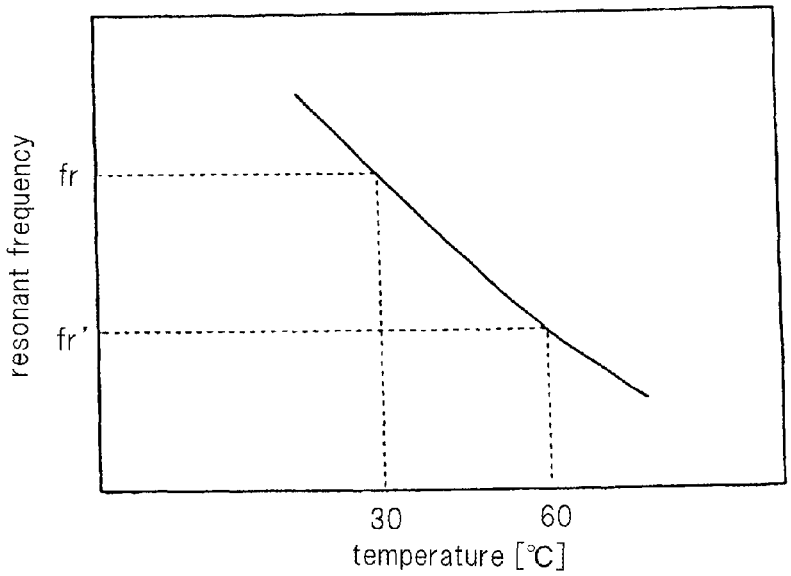
FIG. 13 is a graph showing the result of an experiment for measuring the temperature dependency of a resonant frequency.

FIG. 13 is a graph showing the result of an experiment for measuring the temperature dependency of a resonant frequency. The experiment was conducted on a general optical scanning device placed in a measuring system. The graph has a vertical axis representing resonant frequencies and a horizontal axis representing temperatures of the measuring system. As shown in FIG. 13, when the temperature of the measuring system rises from 30 degrees to 60 degrees, the resonant frequency drops from fr to fr'. If the torsional beams and the support of the optical scanning device are made of a general Si material, then the resonant frequency drops about 0.5%.

With the optical scanning device shown in FIG. 11, when the prescribed voltage V3 is applied to piezoelectric element 15 and piezoelectric element 16, it is possible to apply a necessary stress depending on the magnitude of voltage V3 to torsional beams 22, 23, thereby adjusting the rigidity of these beams. As a result, the resonant frequency can be changed.

Figure 14:
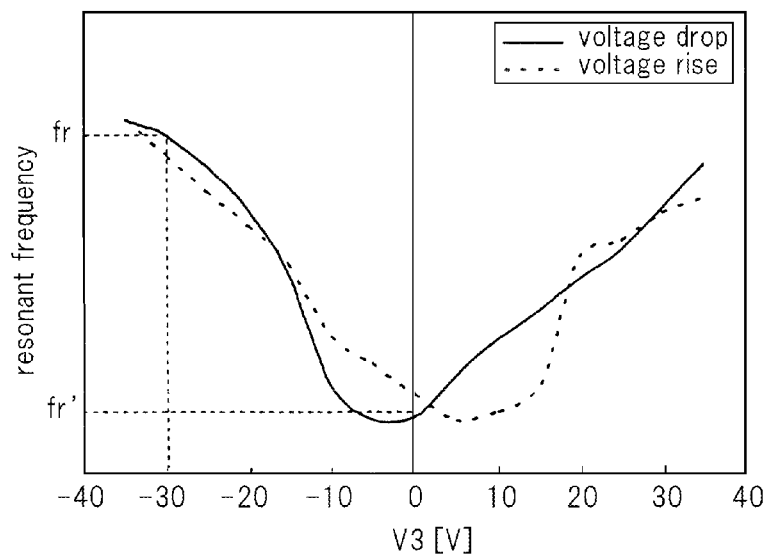
FIG. 14 is a graph showing the resonant frequency of a mirror at the time a voltage V3 that is applied to an adjuster of the optical scanning device according to the third exemplary embodiment is changed.

The adjustability of the resonant frequency will be described below with reference to the result of an experiment conducted on the optical scanning device according to the present exemplary embodiment. FIG. 14 is a graph showing the resonant frequency of a mirror at the time voltage V3 is changed. The graph has a vertical axis representing resonant frequencies and horizontal axis values of voltage V3. The solid-line curve was plotted when voltage V3 was changed from a positive voltage to 0 V to a negative voltage, and the broken-line curve was plotted when voltage V3 was changed from a negative voltage to 0 V to a positive voltage.

When voltage V3 applied to lower electrodes 101 of piezoelectric element 15 and piezoelectric element 16 is lowered from a positive voltage to 0 [V] and the absolute value of its negative voltage is increased, the resonant frequency of mirror 21 is increased from fr' to fr at the time V3=−30 [V] as indicated by the solid-line curve. In this manner, a change in the resonant frequency due to a temperature change can be compensated for, thus minimizing the deterioration of the image projecting capability of the image display device. Though a reduction in the resonant frequency fr has been described with reference to FIG. 12, a change in the resonant frequency fr can also be compensated for when the resonant frequency fr increases.

The structure disclosed in Patent document 5 and Patent document 6 is problematic in that a reduction in the mirror rotational angle cannot be eliminated when the mirror is vibrated because the rigidity of the actuators on which the piezoelectric elements are mounted is reduced. According to the present exemplary embodiment, the advantage of the reduced size of the optical scanning device is not impaired, but the resonant frequency of the mirror can be adjusted by a simple structure. As a result, the angle of field of images projected by the image display device can be retained. The present exemplary embodiment offers the same advantages as the first exemplary embodiment.

Fourth Exemplary Embodiment

An optical scanning device according to the present exemplary embodiment is capable of eliminating an unwanted vibration mode of the mirror.

Figure 15:
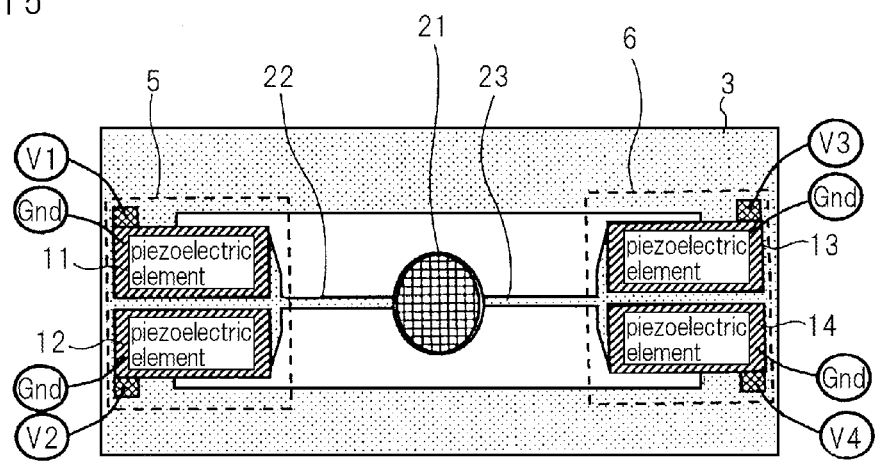
FIG. 15 is a plan view showing a configurational example of an optical scanning device according to a fourth exemplary embodiment.

FIG. 15 is a plan view showing a configurational example of an optical scanning device according to a fourth exemplary embodiment. Those parts of the optical scanning device shown in FIG. 15 which are identical to those according to the first exemplary embodiment are denoted by identical reference characters. As shown in FIG. 15, the optical scanning device according to the present exemplary embodiment is identical in configuration to the optical scanning device shown in FIG. 1, and its cross-sectional structure is also identical to the structure shown in FIG. 2. However, the optical scanning device according to the present exemplary embodiment operates differently from the optical scanning device according to the first exemplary embodiment. The configuration of the optical scanning device according to the present exemplary embodiment will not be described in detail below, but operation thereof will be described in detail below.

Operation of the optical scanning device according to the present exemplary embodiment will be described below.

Figure 16:
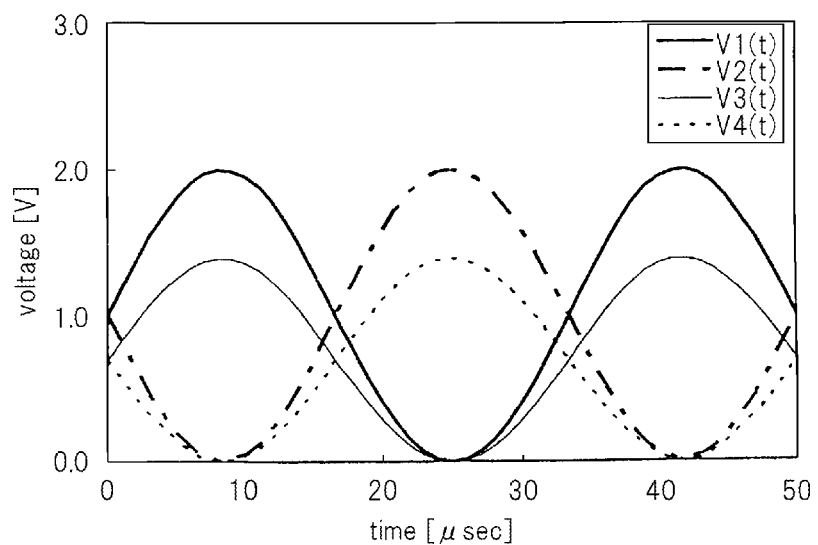
FIG. 16 is a graph showing voltages applied to respective piezoelectric elements of the optical scanning device according to the fourth exemplary embodiment.

FIG. 16 is a graph showing voltages applied to respective piezoelectric elements 11 through 14. According to the present exemplary embodiment, voltage V1(t) is applied to piezoelectric element 11, voltage V2(t) to piezoelectric element 12, voltage V3(t) to piezoelectric element 13, and voltage V4(t) to piezoelectric element 14.

As shown in FIG. 16, voltages V1(t) and V3(t) are in phase with each other, but have different maximum voltage values, and voltages V2(t) and V4(t) are in phase with each other, but have different maximum voltage values. As shown in FIG. 15, the voltages applied to piezoelectric elements 11, 13 which are positioned above the longitudinal central axis of torsional beams 22, 23 are in phase with each other, and the voltages applied to piezoelectric elements 12, 14 which are positioned below the longitudinal central axis of torsional beams 22, 23 are in phase with each other. As shown in FIG. 16, voltages V1(t) and V3(t) are 180 degrees out of phase with voltages V2(t) and V4(t).

Since mirror 21 is not eccentrically displaced, when voltage V1(t) and voltage V2(t) are 180 degrees out of phase with each other, voltage V3(t) and voltage V4(t) are also 180 degrees out of phase with each other, thus maximizing the rotational angle of mirror 21, as described above with reference to FIG. 4. According to the present exemplary embodiment, it is possible to adjust the drive forces applied to mirror 21 by setting the absolute values of voltages applied to the piezoelectric elements for the respective piezoelectric elements.

For example, it is assumed that voltages V1(t) through V4(t) are set as follows:

$V1(t) = 0.5 V_{p-p}(1+\sin(2\pi ft))[V]$, $V2(t) = 0.5 V_{p-p}(1-\sin(2\pi ft))[V]$, $V3(t) = 0.5 \alpha V_{p-p}(1+\sin(2\pi ft))[V]$, and $V4(t) = 0.5 \alpha V_{p-p}(1-\sin(2\pi ft))[V]$.

By setting the factor α in voltages V3(t), V4(t) to a value other than 1, it is possible to differentiate the drive force applied from left actuator 5 to mirror 21 in FIG. 15 and the drive force applied from right actuator 6 to mirror 21 in FIG. 15. The factor α may be set to any value in a range from 0.1 to 10, for example.

Advantages accruing from adjusting the drive forces applied to mirror 21 will be described below.

Figure 17A:
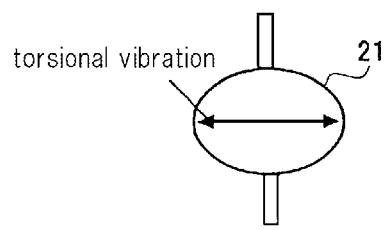
FIG. 17A is a view illustrative of a situation wherein there is no difference between drive forces produced by two actuators for the mirror.
Figure 17B:
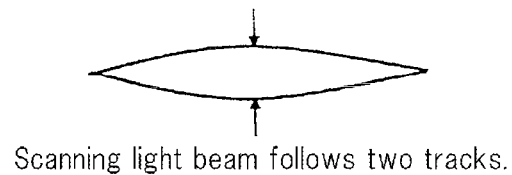
FIG. 17B is a view illustrative of a situation wherein there is a difference between drive forces produced by the two actuators for the mirror.
Figure 17B:
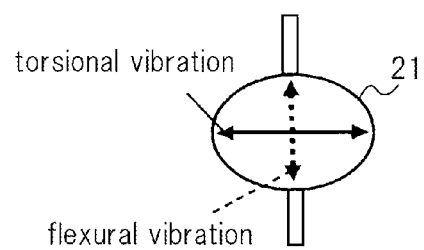

FIG. 17A is a view showing mirror 21 actuated by the drive forces applied from actuators 5, 6 when the drive forces are not different from each other. FIG. 17B is a view showing mirror 21 actuated by the drive forces applied from actuators 5, 6 when the drive forces are different from each other. FIGS. 17A and 17B show mirror 21 before the drive forces are adjusted, and it is assumed that the factor α in the above equations about V3(t), V4(t) has a value of 1.

If the drive force applied from actuator 5 to mirror 21 and the drive force applied from actuator 6 to mirror 21 are not different from each other, then as shown in a lower portion of FIG. 17A, mirror 21 will not generate a mode other than a torsional vibration mode for torsional beams 22, 23. As a result, as shown in an upper portion of FIG. 17A, the scanning beam reflected by the mirror surface reciprocates along a single path, and follows a track represented by a line segment in a certain range.

If the drive force applied from actuator 5 to mirror 21 and the drive force applied from actuator 6 to mirror 21 are different from each other, then as shown in a lower portion of FIG. 17B, the mirror surface will cause flexural vibrations in directions perpendicular to the directions of torsional vibrations. As a result, as shown in the upper portion of FIG. 17B, the scanning beam reflected by the mirror surface follows two separate tracks. In the upper portion of FIG. 17B, the tracks followed by the scanning beam are represented by two curves whose opposite ends are joined together, and an area sandwiched between these curves becomes progressively wider from the ends toward the center.

It is assumed that of the two curves, the upper curve represents the track followed by the scanning beam as it travels forwards, and the lower upper curve represents the track followed by the scanning beam as it travels backwards. The distance between the upper curve and the lower curve will hereinafter referred to as "separation width". If the separation width is zero, then the ideal state shown in FIG. 17A will be achieved. The separation width represented by the tracks of the scanning beam becomes greater as the distance from the mirror surface becomes larger. Therefore, the magnitude of the separation width may be expressed by the angle between the direction of the light beam which is reflected by the mirror surface to scan the upper curve and the direction of the light beam which is reflected by the mirror surface to scan the lower curve. The angle will hereinafter be referred to as "split".

The reasons for the flexural vibrations shown in FIG. 17B will be described below. Even if actuators 5, 6 are designed symmetrically with respect to mirror 21, it is difficult to strictly equalize the left and right drive forces because of size variations and characteristic variations of the piezoelectric elements. Therefore, the left and right drive forces in actually fabricated optical scanning devices are considered to be somewhat different from each other. If the difference between the left and right drive forces is large, then, as shown in FIG. 17B, the scanning light beam is caused to follow two tracks. If the scanning light beam that follows both of the tracks is used in the rendering process of the image display device, then a desired image will not be displayed.

Figure 18:
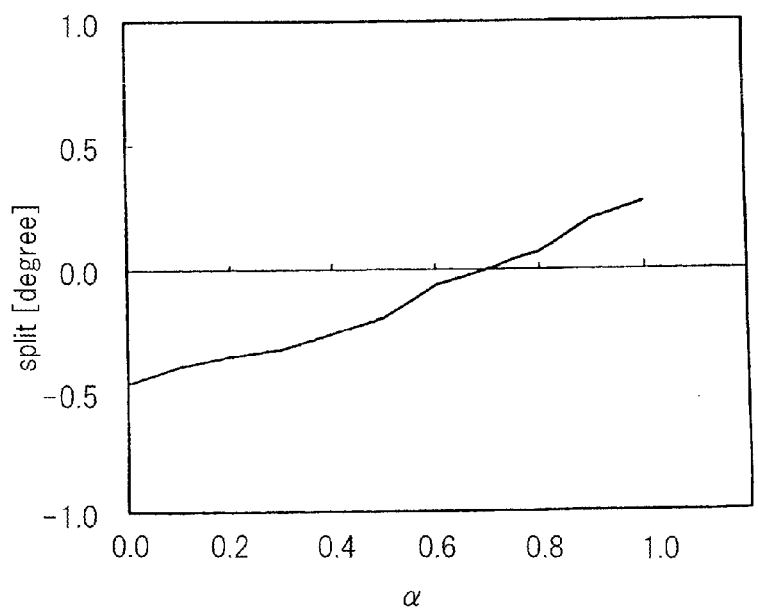
FIG. 18 is a graph showing the relationship between an adjusting factor for one of the two actuators which sandwich the mirror therebetween and a split.

If the drive forces generated by left and right actuators 5, 6 can be adjusted, then the difference between the drive forces can be reduced to zero in principle. FIG. 18 is a graph showing the relationship between the adjustment factor of one of the two actuators that sandwich the mirror therebetween and the split.

Specifically, FIG. 18 shows the result achieved when factor α with respect to the absolute values of the voltages applied to piezoelectric elements 13, 14 shown in FIG. 15 was changed. The graph has a horizontal axis representing values of factor α and a vertical axis representing the split. In FIG. 15, piezoelectric elements 13, 14 are associated with actuator 6 on the right side of mirror 21. As shown in FIG. 18, the optical scanning device used in the experiment was successful in eliminating the separation width of the scanning beam with α=0.7. No deterioration was seen in the image rendering capability.

In the present exemplary embodiment, the factor with respect to the absolute values of the voltages V3(t), V4(t) was adjusted to eliminate the flexural vibrations of mirror 21. However, the factor with respect to the absolute values of the voltages V1(t), V2(t), rather than the voltages V3(t), V4(t), may be adjusted.

The structure disclosed in Patent document 5 and Patent document 6 is problematic in that since the rigidity of the actuators with the piezoelectric elements mounted thereon is reduced, an unexpected vibration mode which occurs when the mirror is vibrated cannot be eliminated.

According to the present exemplary embodiment, the advantage of the small size of the optical scanning device is not impaired, and even if the scanning beam follows two tracks, the width between the two tracks followed by the scanning beam can be reduced to zero by a simple structure. As a result, it is possible to achieve a scanning beam suitable for the projection of images by the image display device. The rigidity of support 3 can be maintained by controlling flexural vibrations. Any wasteful operation of mirror 21 is reduced by controlling flexural vibrations which are detrimental to the turning of mirror 21, resulting in a reduction in electric power consumption of the optical scanning device. The present exemplary embodiment offers the same advantages as the first exemplary embodiment.

According to either one of the above exemplary embodiments, it is possible to provide an optical scanning device whose movable component can be displaced greatly and can have a mirror surface to achieve a large beam deflection angle. The phase of the voltages applied to the respective piezoelectric elements can be adjusted as desired for reduced electric power consumption.

An exemplary advantage of the invention is a reduction in the overall size of the device while achieving a sufficient rotational angle of the mirror.

The optical scanning devices according to the second through fourth exemplary embodiments may be incorporated in the image display device described above in the first exemplary embodiment. The optical scanning devices according to the first through fourth exemplary embodiments may be combined with each other.

In the first exemplary embodiment, piezoelectric layers 102 are separately included in respective piezoelectric elements 11, 12. However, piezoelectric layers 102 in respective piezoelectric elements 11, 12 may not be separate from each other, but may be a piezoelectric layer that is contiguous even in an area between piezoelectric elements 11, 12. This also holds true for the second exemplary embodiment. As with piezoelectric elements 11, 12, piezoelectric elements 13, 14 may be a piezoelectric layer that is contiguous even in an area between these piezoelectric elements. This also holds true for the fourth exemplary embodiment. In the third embodiment, piezoelectric elements 11, 12, 15 may include a common piezoelectric layer, and piezoelectric elements 13, 14, 16 may include a common piezoelectric layer.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

(Further exemplary embodiment 1) An optical scanning device comprising a movable mirror for reflecting a light beam applied thereto, a first beam joined to an end of said movable mirror, a second beam joined to another end of said movable mirror, a first piezoelectric element for generating stress for swinging said movable mirror through said first beam when a first voltage is applied to the first piezoelectric element, and a second piezoelectric element for generating stress for swinging said movable mirror through said first beam when a second voltage is applied to the second piezoelectric element, wherein said first piezoelectric element and said second piezoelectric element have respective patterns whose longitudinal directions are aligned with a longitudinal direction of said first beam, and said first piezoelectric element and said second piezoelectric element are disposed on a support plate which is joined to said first beam and said second beam with an insulative distance between said first piezoelectric element and said second piezoelectric element.

(Further exemplary embodiment 2) The optical scanning device according to further exemplary embodiment 1, further comprising a third piezoelectric element for generating stress for swinging said movable mirror through said second beam when said first voltage is applied to the third piezoelectric element, and a fourth piezoelectric element for generating stress for swinging said movable mirror through said second beam when said second voltage is applied to the fourth piezoelectric element, wherein said third piezoelectric element and said fourth piezoelectric element have respective patterns whose longitudinal directions are aligned with a longitudinal direction of said second beam, and said third piezoelectric element and said fourth piezoelectric element are disposed on said support plate, which no hole being present between said third piezoelectric element and said fourth piezoelectric element and having an insulative distance being present between said third piezoelectric element and said fourth piezoelectric element.

(Further exemplary embodiment 3) The optical scanning device according to further exemplary embodiment 2, wherein said first piezoelectric element and said second piezoelectric element are disposed in axisymmetric positions with respect to a straight line extending from a longitudinal central axis of said first beam, and said third piezoelectric element and said fourth piezoelectric element are disposed in axisymmetric positions with respect to a straight line extending from a longitudinal central axis of said second beam.

(Further exemplary embodiment 4) The optical scanning device according to further exemplary embodiment 3, wherein the straight line extending from the longitudinal central axis of said first beam or said second beam serves as a boundary line dividing a plane into two areas, said first piezoelectric element and said third piezoelectric element are disposed in one of said two areas, and said second piezoelectric element and said fourth piezoelectric element are disposed in the other of said two areas which is different from said one of said two areas.

(Further exemplary embodiment 5) The optical scanning device according to further exemplary embodiment 1, wherein said movable mirror has a center of gravity disposed in a position which is spaced a predetermined distance vertically from the longitudinal central axes of said first beam and said second beam.

This application is based upon and claims the benefit of priority from Japanese Patent Application No. 2010-170756 filed on Jul. 29, 2010, the content of which is incorporated by reference.

DESCRIPTION OF REFERENCE CHARACTERS 2 frame
3 support
5, 6 actuator
7, 8 adjuster
11 through 16 piezoelectric element
22, 23 torsional beam
101 lower electrode
102 piezoelectric layer
103 upper electrode

The invention claimed is:

1. An optical scanning device comprising:
a movable mirror reflecting a light beam applied thereto;
a first beam joined to an end of said movable mirror;
a second beam joined to another end of said movable mirror;
a first piezoelectric element generating stress for swinging said movable mirror through said first beam when a first voltage is applied to the first piezoelectric element; and
a second piezoelectric element generating stress for swinging said movable mirror through said first beam when a second voltage is applied to the second piezoelectric element;
a third piezoelectric element generating stress for swinging said movable mirror through said second beam when said first voltage is applied to the third piezoelectric element;
a fourth piezoelectric element generating stress for swinging said movable mirror through said second beam when said second voltage is applied to the fourth piezoelectric element;
a fifth piezoelectric element disposed between said first piezoelectric element and said second piezoelectric element, generating stress for swinging said movable mirror through said first beam when a third voltage is applied to the fifth piezoelectric element; and
a sixth piezoelectric element disposed between said third piezoelectric element and said fourth piezoelectric element generating stress for swinging said movable mirror through said second beam when said third voltage is applied to the sixth piezoelectric element,
wherein:
said first piezoelectric element and said second piezoelectric element have respective patterns whose longitudinal directions are aligned with a longitudinal direction of said first beam;
said first piezoelectric element and said second piezoelectric element are disposed on a support plate which is joined to said first beam and said second beam, said first piezoelectric element and said second piezoelectric element having an insulating distance between them;
no hole is present between said first piezoelectric element and said second piezoelectric element;
said third piezoelectric element and said fourth piezoelectric element have respective patterns whose longitudinal directions are aligned with a longitudinal direction of said second beam; and
said third piezoelectric element and said fourth piezoelectric element are disposed on said support plate, with no hole being present between said third piezoelectric element and said fourth piezoelectric element and said third piezoelectric element and said fourth piezoelectric element having an insulating distance between them.

2. The optical scanning device according to claim 1, wherein said fifth piezoelectric element and said sixth piezoelectric element have respective patterns whose longitudinal directions are aligned with the longitudinal direction of said first beam or said second beam; and
said fifth piezoelectric element and said sixth piezoelectric element are disposed on said support plate, with no hole being present between said fifth piezoelectric element and said sixth piezoelectric element and the other piezoelectric elements adjacent thereto, and said fifth piezoelectric element and said sixth piezoelectric element having insulating distances from the other piezoelectric elements adjacent thereto.

3. The optical scanning device according to claim 1, wherein said third voltage comprises a static voltage.

4. The optical scanning device according to claim 1, wherein said first voltage and said second voltage are out of phase with each other by 90 degrees or greater.

5. The optical scanning device according to claim 4, wherein said first voltage and said second voltage are out of phase with each other by 180 degrees.

6. An image display device including at least an optical scanning device according to claim 1 as either a horizontal scanning element or a vertical scanning element.

* * * * *